(12) United States Patent
Whittum

(10) Patent No.: US 10,780,982 B2
(45) Date of Patent: Sep. 22, 2020

(54) COOLING SYSTEMS HAVING INLINE SUPPLEMENTAL RAM AIR HEAT EXCHANGERS

(71) Applicant: Goodrich Corporation, Charlotte, NC (US)

(72) Inventor: Mark Long Whittum, Newton, MA (US)

(73) Assignee: Goodrich Corporation, Charlotte, NC (US)

( * ) Notice: Subject to any disclaimer, the term of this patent is extended or adjusted under 35 U.S.C. 154(b) by 80 days.

(21) Appl. No.: 15/920,107

(22) Filed: Mar. 13, 2018

(65) Prior Publication Data

US 2019/0283885 A1    Sep. 19, 2019

(51) Int. Cl.
*B64D 13/08* (2006.01)
*B64D 13/06* (2006.01)

(52) U.S. Cl.
CPC .............. *B64D 13/08* (2013.01); *B64D 13/06* (2013.01); *B64D 2013/064* (2013.01); *B64D 2013/0618* (2013.01); *B64D 2013/0674* (2013.01); *Y10S 62/05* (2013.01)

(58) Field of Classification Search
CPC ............ B64D 13/08; B64D 2013/0618; B64D 13/06; B64D 13/00; B64D 11/04; H05K 7/20536; H05K 7/207; F25B 40/04; F25B 40/00; F25B 1/00; F25B 25/005; F25B 9/004; F25D 16/00
See application file for complete search history.

(56) References Cited

U.S. PATENT DOCUMENTS

| | | | |
|---|---|---|---|
| 4,869,071 A * | 9/1989 | Wehner | B64D 13/00 62/133 |
| 5,704,218 A | 1/1998 | Christians et al. | |
| 6,127,758 A * | 10/2000 | Murry | B64D 41/007 244/53 R |
| 6,257,003 B1 | 7/2001 | Hipsky | |
| 2009/0260387 A1 | 10/2009 | DeFrancesco | |
| 2012/0291459 A1* | 11/2012 | Millar | B64D 11/04 62/79 |

(Continued)

FOREIGN PATENT DOCUMENTS

| EP | 2710313 B1 | 6/2017 |
|---|---|---|
| EP | 3339177 A1 | 6/2018 |

OTHER PUBLICATIONS

Extended European search report issued in corresponding EP patent application No. 19161731.5, dated Jul. 3, 2019.

*Primary Examiner* — Emmanuel E Duke
(74) *Attorney, Agent, or Firm* — Locke Lord LLP; Daniel J. Fiorello; Scott D. Wofsy

(57) ABSTRACT

A cooling system for a vehicle can include a coolant loop having a coolant therein and configured to be in thermal communication with a heat load to receive heat from the heat load, a refrigeration system comprising an evaporator in thermal communication with the coolant loop to receive heat from the coolant loop, and a condenser configured to be in thermal communication with ram air to remove heat from the refrigeration system, an inline ram air heat exchanger disposed in a ram air stream of the condenser, and a ram air cooling branch in fluid communication with the coolant loop and configured to direct coolant to the ram air heat exchanger to cool the coolant.

10 Claims, 1 Drawing Sheet

(56) References Cited

U.S. PATENT DOCUMENTS

2017/0174348 A1* 6/2017 Shea ................. B64D 13/02
2017/0268838 A1   9/2017 Army et al.
2018/0178916 A1* 6/2018 Whittum ............ B64D 13/08

* cited by examiner

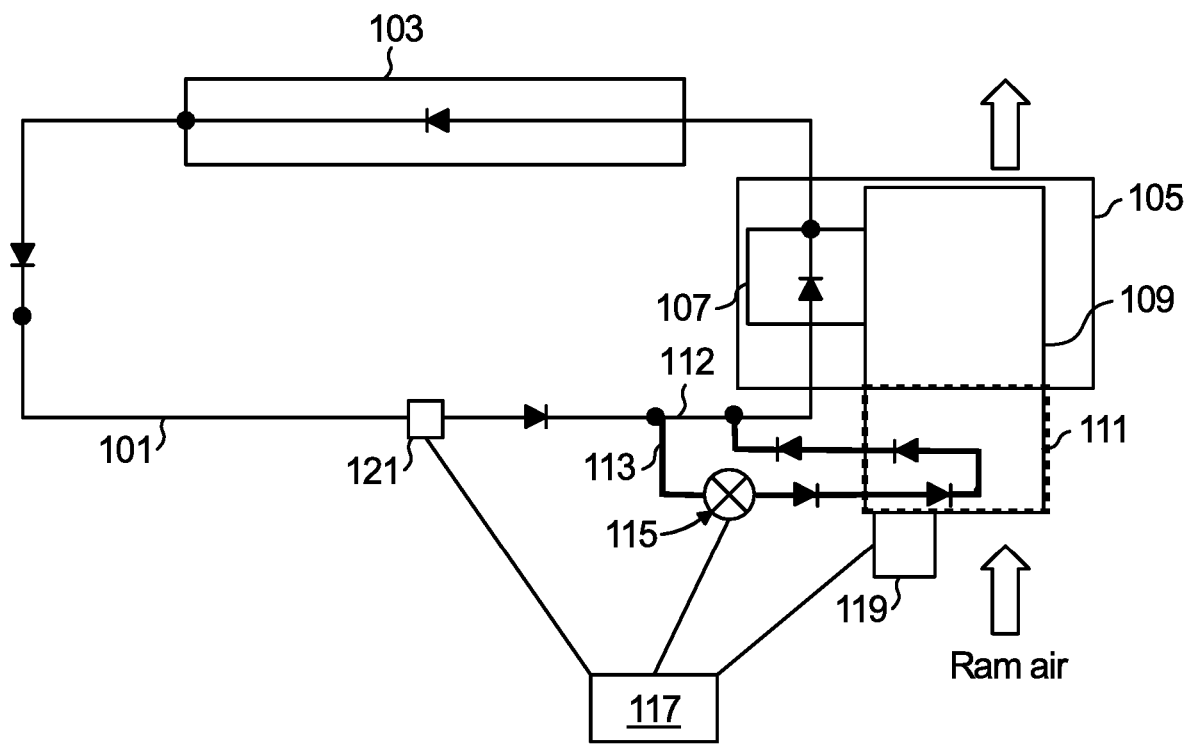

COOLING SYSTEMS HAVING INLINE SUPPLEMENTAL RAM AIR HEAT EXCHANGERS

BACKGROUND

1. Field

The present disclosure relates to cooling systems, e.g., for aircraft electronics.

2. Description of Related Art

The increased amount and/or power of electronics, e.g., in aircraft cause higher heat loads being dumped into connected cooling systems (e.g., an environmental control system (ECS)). These high heat loads strain capacity of existing cooling systems (e.g., the compact ECS system on fast jet platform).

Such conventional methods and systems have generally been considered satisfactory for their intended purpose. However, there is still a need in the art for improved cooling systems. The present disclosure provides a solution for this need.

SUMMARY

In accordance with at least one aspect of this disclosure, a cooling system for a vehicle can include a coolant loop having a coolant therein and configured to be in thermal communication with a heat load to receive heat from the heat load, and a refrigeration system comprising an evaporator in thermal communication with the coolant loop to receive heat from the coolant loop and a condenser configured to be in thermal communication with ram air to remove heat from the refrigeration system. The system includes an inline ram air heat exchanger disposed in a ram air stream of the condenser, and a ram air cooling branch in fluid communication with the coolant loop and configured to direct coolant to the ram air heat exchanger to cool the coolant.

In certain embodiments, the ram air cooling branch can be in fluid communication with the coolant loop downstream of the heat load and upstream of the evaporator. The system can include a valve configured to selectively allow and/or meter flow through the ram air cooling branch.

The system can include a controller to control the valve. In certain embodiments, a ram air temperature sensor can be operatively connected to the ram air heat exchanger to sense temperature of the ram air. The controller can be configured to control the valve as a function of the temperature of the ram air. For example, in certain embodiments, the controller is configured to close the valve at a one or both of a high temperature threshold or a low temperature threshold.

The system can include a coolant temperature sensor operatively connected to the coolant loop to determine a temperature of a coolant. The controller can be configured to control the valve as a function of both the ram air temperature and the coolant temperature. For example, the controller can be configured to close the valve when ram air temperature is higher than the coolant temperature to prevent heat addition to the coolant from the ram air.

The ram air heat exchanger can be disposed upstream of the condenser in the ram air stream. Any other suitable position is contemplated herein.

The refrigeration system can be an environmental control system (ECS) of an aircraft. In certain embodiments, the controller can be an environmental control system (ECS) controller for the ECS of the aircraft. However, a stand-alone controller or any other suitable aircraft controller is contemplated herein.

A method can include allowing a coolant to flow from a coolant loop to a ram air heat exchanger that is in a ram air stream of a ram air cooled condenser of a refrigeration system. The ram air heat exchanger can be upstream of the condenser in the ram air stream such that heat from the coolant is added to the ram air stream before ram air cools the condenser. Allowing a coolant to flow can include controlling a valve in a ram air cooling branch, which is in thermal communication with the ram air heat exchanger, to allow coolant to flow from the coolant loop, into the ram air cooling branch to the ram air heat exchanger, and back to the coolant loop. Controlling the valve can include controlling the valve as a function of temperature of at least one of the ram air and/or the coolant.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a schematic diagram of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to improve thermal management, e.g., in aircraft electronics cooling systems.

Referring to FIG. 1, a cooling system 100 for a vehicle (e.g., an aircraft) can include a coolant loop 101 having a coolant (e.g., water, a dielectric coolant, or any other suitable coolant) therein and configured to be in thermal communication with a heat load 103 (e.g., aircraft avionics) to receive heat from the heat load 103. The system 100 includes a refrigeration system 105 comprising an evaporator 107 in thermal communication with the coolant loop 101 to receive heat from the coolant loop 101. The refrigeration system 105 also includes a condenser 109 configured to be in thermal communication with ram air to remove heat from the refrigeration system 105. While not shown, the refrigeration system 105 can include any other suitable components (e.g., a compressor, an expander) for proper function of the refrigeration cycle as appreciated by those having ordinary skill in the art.

The system 100 includes an inline ram air heat exchanger 111 disposed in a ram air stream of the condenser 109. The system 100 also includes a ram air cooling branch 113 in fluid communication with the coolant loop 101 and configured to direct coolant to the ram air heat exchanger 111 to cool the coolant.

In certain embodiments, as shown, the ram air cooling branch 113 can be in fluid communication with the coolant loop 101 downstream of the heat load 103 and upstream of the evaporator 107. The system 100 can include a valve 115 configured to selectively allow and/or meter flow through the ram air cooling branch 113. The valve 115 can include any suitable valve type, e.g., a solenoid valve. In certain embodiments, when the valve 115 is in a closed position, it can allow flow only through loop branch 112, and when the valve 115 is in the open position, it can allow flow through the cooling branch 113. Any suitable position for metering flow between loop branch 112 and cooling branch 113 is contemplated herein.

It is contemplated that the valve 115 can be a multi-way valve and connected to both the loop branch 112 and the cooling branch 113 to simultaneously allow, prevent, or meter flow to or between the loop branch 112 and the cooling branch 113. In certain embodiments, a separate valve can be disposed on the loop branch 112 and controlled independently of valve 115. Any other suitable valving or control for allowing, preventing, and/or metering flow between the cooling branch 113 and the coolant loop 101/loop branch 112 is contemplated herein.

The system 100 can include a controller 117 to control the valve 115. The controller 117 can include any suitable hardware module(s) and/or software module(s) configured to perform any function or functions as described herein, and/or any other suitable function(s).

In certain embodiments, a ram air temperature sensor 119 can be operatively connected to the ram air heat exchanger 111 to sense temperature of the ram air coming in to the ram air heat exchanger 111. The controller 117 can be configured to control the valve 115 as a function of the temperature of the ram air. For example, in certain embodiments, the controller 117 is configured to close the valve 115 at a one or both of a high temperature threshold or a low temperature threshold.

The system 100 can include a coolant temperature sensor 121 operatively connected to the coolant loop 101 to determine a temperature of a coolant. The controller 117 can be operatively connected to the coolant temperature sensor 121 and can be configured to control the valve 115 as a function of both the ram air temperature 119 and the coolant temperature 121. For example, the controller 117 can be configured to close the valve 115 when ram air temperature is higher than the coolant temperature to prevent heat addition to the coolant from the ram air.

It is also contemplated that the system may only include a coolant temperature sensor 121 and that the controller 117 may only be connected to the coolant temperature sensor 121 to control the valve as function of coolant temperature. For example, the controller 121 can determine the effect of allowing coolant to flow through the ram air cooling branch 113 by monitoring coolant temperature as a function of time and valve position. For example, if the temperature of the coolant 101 rises after opening the valve 115, the controller 117 can close the valve 115 to prevent additional heat addition to the coolant. If the temperature of the coolant drops below a low threshold, and/or if the rate of cooling of the coolant is higher than a rate threshold, then controller 117 can close the valve 115 to prevent excessive cooling of the coolant. Any other suitable control scheme is contemplated herein.

As shown, the ram air heat exchanger 111 can be disposed upstream of the condenser 109 in the ram air stream. Any other suitable position is contemplated herein. For example, the ram air heat exchanger 111 can be downstream of the condenser 109, however, this causes heat rejected from the condenser 109 to be transferred to the coolant through the ram air heat exchanger 111, which may be acceptable in certain embodiments.

The refrigeration system 105 can be an environmental control system (ECS) of an aircraft. In certain embodiments, the controller 117 can be an environmental control system (ECS) controller for the ECS of the aircraft. However, a stand-alone controller or any other suitable aircraft controller is contemplated herein.

In accordance with at least one aspect of this disclosure, a method can include allowing a coolant to flow from a coolant loop to a ram air heat exchanger that is in a ram air stream of a ram air cooled condenser of a refrigeration system. The ram air heat exchanger can be upstream of the condenser in the ram air stream such that heat from the coolant is added to the ram air stream before ram air cools the condenser. Allowing a coolant to flow can include controlling a valve in a ram air cooling branch, which is in thermal communication with the ram air heat exchanger, to allow coolant to flow from the coolant loop, into the ram air cooling branch to the ram air heat exchanger, and back to the coolant loop. Controlling the valve can include controlling the valve as a function of temperature of at least one of the ram air and/or the coolant.

Embodiments include and ECS condenser with an inline supplemental heat exchanger. In certain embodiments, a coolant heat exchanger can be in same flow path as an ECS condenser. Embodiments provides added ECS capacity for high heat dissipation systems. The addition of an inline heat exchanger upstream of the condenser reduces the overall mass flow through the condenser. Even though embodiments increase the temperature of the air going into the condenser (in embodiments having a heat exchanger up stream of the condenser) which reduces the capacity of the condenser itself, it has been found that the capacity added by the heat exchanger more than offsets the loss in capacity of the condenser, which is counter intuitive.

Also, existing ECS systems shut down at low temps (e.g., about 10 C and under) to avoid damage to the compressor from slugging. Embodiments allow coolant in electronics loop to still be cooled in that scenario by the ram air heat exchanger 111 irrespective of a refrigeration system.

As will be appreciated by those skilled in the art, aspects of the present disclosure may be embodied as a system, method or computer program product. Accordingly, aspects of this disclosure (e.g., a controller) may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A cooling system for a vehicle, comprising: a coolant loop having a coolant therein and configured to be in thermal communication with a heat load to receive heat from the heat load; a refrigeration system comprising an evaporator in thermal communication with the coolant loop to receive heat from the coolant loop, and a condenser configured to be in thermal communication with ram air to remove heat from the refrigeration system; an inline ram air heat exchanger disposed in a ram air stream of the condenser; a ram air cooling branch in fluid communication with the coolant loop and configured to direct coolant to the ram air heat exchanger to cool the coolant; a valve configured to selectively allow and/or meter coolant flow through the ram air cooling branch; a ram air temperature sensor operatively connected to the ram air heat exchanger to sense temperature of the ram air; and a controller configured to control the valve, wherein the controller is configured to control the valve as a function of the temperature of the ram air, wherein the controller includes one or more modules configured to close the valve at a low temperature threshold of the ram air.

2. The system of claim 1, wherein the ram air cooling branch is in fluid communication with the coolant loop downstream of the heat load and upstream of the evaporator.

3. The system of claim 1, further comprising a coolant temperature sensor operatively connected to the coolant loop to determine a temperature of a coolant, wherein the controller is configured to control the valve as a function of both the ram air temperature and the coolant temperature.

4. The system of claim 3, wherein the controller is configured to close the valve when ram air temperature is higher than the coolant temperature to prevent heat addition to the coolant from the ram air.

5. The system of claim 1, wherein the ram air heat exchanger is upstream of the condenser in the ram air stream.

6. The system of claim 1, wherein the refrigeration system is an environmental control system (ECS) of an aircraft.

7. The system of claim 1, wherein the controller is an environmental control system (ECS) controller for an ECS of an aircraft.

8. A method, comprising: allowing a coolant to flow from a coolant loop to a ram air heat exchanger that is in a ram air stream of a ram air cooled condenser of a refrigeration system, wherein allowing a coolant to flow includes controlling a valve in a ram air cooling branch, which is in thermal communication with the ram air heat exchanger, to allow coolant to flow from the coolant loop, into the ram air cooling branch to the ram air heat exchanger, and back to the coolant loop, wherein controlling the valve includes controlling the valve as a function of temperature of the ram air, wherein controlling the valve includes closing the valve at a low temperature threshold of the ram air.

9. The method of claim 8, wherein the ram air heat exchanger is upstream of the condenser in the ram air stream such that heat from the coolant is added to the ram air stream before ram air cools the condenser.

10. The method of claim 8, wherein controlling the valve includes additionally controlling the valve as a function of temperature of the coolant.

\* \* \* \* \*